(12) United States Patent
Fukuoka et al.

(10) Patent No.: US 11,785,538 B2
(45) Date of Patent: Oct. 10, 2023

(54) COMMUNICATION CONTROL DEVICE, COMMUNICATION CONTROL SYSTEM, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventors: Aki Fukuoka, Tokyo (JP); Toru Okugawa, Tokyo (JP); Shinya Arita, Tokyo (JP); Shunsuke Homma, Tokyo (JP); Hidetaka Nishihara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 193 days.

(21) Appl. No.: 17/267,756

(22) PCT Filed: Aug. 9, 2019

(86) PCT No.: PCT/JP2019/031763
§ 371 (c)(1),
(2) Date: Feb. 10, 2021

(87) PCT Pub. No.: WO2020/036156
PCT Pub. Date: Feb. 20, 2020

(65) Prior Publication Data
US 2021/0219225 A1 Jul. 15, 2021

(30) Foreign Application Priority Data
Aug. 13, 2018 (JP) ................................ 2018-152530

(51) Int. Cl.
*H04W 48/18* (2009.01)
*H04W 12/06* (2021.01)
(Continued)

(52) U.S. Cl.
CPC ........... *H04W 48/18* (2013.01); *H04W 12/06* (2013.01); *H04W 48/16* (2013.01); *H04W 88/16* (2013.01)

(58) Field of Classification Search
CPC ..... H04W 48/18; H04W 12/06; H04W 48/16; H04W 88/16; H04L 41/5051
See application file for complete search history.

(56) References Cited

U.S. PATENT DOCUMENTS 9,515,875 B2 * 12/2016 Baugher ............. H04L 12/2834
10,042,665 B2 * 8/2018 Puranik ............... H04L 12/4641
(Continued)

OTHER PUBLICATIONS

Arita et al. (2018) "A Study on Telemetry for Network Slicing," IEICE Technical Report, 118(6): pp. 13-17.

*Primary Examiner* — Julio R Perez

(57) ABSTRACT

A communication control apparatus authenticates a user based on an authentication request transmitted from virtual Customer Premise Equipment (CPE) in response to a request of the user who accesses the virtual network. The communication control apparatus refers to information, held by an operation management system of a service operator, about the user of the virtual network. The communication control apparatus refers to information, collected by a collector, about a network slice constructed in the virtual network. The communication control apparatus selects a network slice through which data flow of the user. The communication control apparatus notifies the virtual CPE of the selected network slice.

20 Claims, 12 Drawing Sheets

(51) Int. Cl.
*H04W 48/16* (2009.01)
*H04W 88/16* (2009.01)

(56) References Cited

U.S. PATENT DOCUMENTS

| | | | |
|---|---|---|---|
| 10,555,171 B2* | 2/2020 | Zaks | H04W 12/041 |
| 10,841,296 B2* | 11/2020 | Nakano | H04L 63/0884 |
| 11,026,166 B2* | 6/2021 | Huang | H04W 8/08 |
| 11,470,545 B2* | 10/2022 | Guionnet | H04W 48/16 |
| 11,533,680 B2* | 12/2022 | Salkintzis | H04W 48/18 |
| 2015/0358399 A1* | 12/2015 | Baugher | H04L 41/40 |
| | | | 709/203 |
| 2016/0353465 A1* | 12/2016 | Vrzic | H04W 8/02 |
| 2017/0164212 A1* | 6/2017 | Opsenica | G06F 16/41 |
| 2019/0223023 A1* | 7/2019 | Altay | H04L 41/5051 |
| 2020/0275360 A1* | 8/2020 | Bordeleau | H04L 41/0816 |
| 2022/0279023 A1* | 9/2022 | Solari | H04L 9/3263 |

* cited by examiner

| SLG INFORMATION | |
|---|---|
| SLG ID | SLG001 |
| ENTIRE HOLDING BAND | 100 G |
| REMAINING BAND | 30 G |
| MEMORY | 2000 TB |
| CPU | A SCALABLE PROCESSOR |
| NFV | DPI, AI, OPTIMIZE, TRANSCODING |

Fig. 3A

| SLG INFORMATION | | | | | | |
|---|---|---|---|---|---|---|
| SLG ID | BAND | HOLDING BAND | REMAINING BAND | MEMORY | CPU | NFV |
|  |  |  |  |  |  |  |
|  |  |  |  |  |  |  |
|  |  |  |  |  |  |  |
|  |  |  |  |  |  |  |
|  |  |  |  |  |  |  |

Fig. 3B

| SLICE INFORMATION | | | | | | | |
|---|---|---|---|---|---|---|---|
| SLICE ID | SLG | SLG | HOLDING BAND | REMAINING BAND | DELAY | NFV | USER ID |
| | | | | | | | |
| | | | | | | | |
| | | | | | | | |
| | | | | | | | |
| | | | | | | | |

Fig. 4

| USER INFORMATION | | |
|---|---|---|
| USER ID | SERVICE CONTENTS | SERVICE QUALITY |
| | | |
| | | |
| | | |
| | | |
| | | |

Fig. 5

COMMUNICATION CONTROL DEVICE, COMMUNICATION CONTROL SYSTEM, COMMUNICATION CONTROL METHOD, AND COMMUNICATION CONTROL PROGRAM

CROSS-REFERENCE TO RELATED APPLICATIONS

This application is a U.S. 371 Application of International Patent Application No. PCT/JP2019/031763, filed on 9 Aug. 2019, which application claims priority to and the benefit of JP Application No. 2018-152530, filed on 13 Aug. 2018, the disclosures of which are hereby incorporated herein by reference in their entireties.

TECHNICAL FIELD

The present invention relates to a communication control apparatus, a communication control system, a communication control method, and a communication control program.

BACKGROUND ART

In recent years, to flexibly address various network services, there is ongoing research on a network slice (hereinafter also referred to as "slice") that quickly constructs a logical network on a common physical resource according to service requirements.

For example, the introduction of network telemetry techniques that measure the traffic, etc., of each slice in real time is under study. There is also a study to connect a plurality of slices that are constructed on physical resources provided by different infrastructure providers and provide the connected slices as a single logical network to a service provider. In addition, in the case of connecting a plurality of slices, a technique has been proposed in which a slice gateway (hereinafter, also referred to as "SLG") is provided to absorb differences in protocols, management policies and the like among infrastructure operators (Non Patent Literature 1).

CITATION LIST

Non Patent Literature

Non Patent Literature 1: Shinya Arita, Hideomi Nishihara, Tohru Okugawa, "Examination of Telemetry Method for Network Slice", IEICE Technical Report, IEICE, Apr. 12, 2018, Vol. 118, No. 6, pp. 13-17

SUMMARY OF THE INVENTION

Technical Problem

It is believed, however, that if the SLG is provided to connect the slices, the SLG may become a bottleneck for the communication.

The SLG is disposed at an edge portion of the slice. The edge portion is an end portion of one slice. Data flow of the user is transmitted by sequentially passing through the plurality of slices. Thus, to assign the user's data flow to an appropriate slice, the SLG holds information about each of the slices. Then, the SLG transmits the data flow to a subsequent slice based on the held information.

At the same time, in transmitting the data flow, the SLG controls a D plane (data transfer function) in accordance with a C plane (path control function). For example, the SLG performs the conversion of the D plane in accordance with the C plane, such as when the protocol of the VLAN differs between slices or when a different tunnel is used.

Thus, in transferring data, the SLG performs two functions: a slice assignment function and a data conversion function. Thus, increase in the volume of the data flow passing through the SLG may possibly lead to excessive processing loads on the SLG. In this case, the SLG may become a bottleneck in realizing a large-capacity network slice.

The disclosed embodiment is devised in light of the foregoing, and its object is to provide a communication control apparatus, a communication control system, a communication control method, and a communication control program that can achieve a large-capacity network slice.

Means for Solving the Problem

A disclosed communication control apparatus includes an authentication unit, a selection unit, and a notification unit. The authentication unit authenticates a user based on an authentication request transmitted from virtual CPE in response to a request of the user who accesses a virtual network. The selection unit refers to information, held by the service operator's operation management system, about the user of the virtual network, and information, collected by the collector, about the network slice constructed in the virtual network, and selects the network slice through which the user's data flow passes. The notification unit notifies the virtual CPE of the network slice selected by the selection unit.

Effects of the Invention

The disclosed communication control apparatus, communication control system, communication control method, and communication control program exhibit the effect of realizing a large-capacity network slice.

BRIEF DESCRIPTION OF DRAWINGS

FIG. 3A is a diagram illustrating an example of the configuration of slice gateway information corresponding to one SLG according to the embodiment.

FIG. 3B is a diagram illustrating an example of the configuration of the slice gateway information stored in a slice gateway storage unit according to the embodiment.

FIG. 4 is a diagram illustrating an example of the configuration of slice information according to the embodiment.

FIG. 5 is a diagram illustrating an example of the configuration of user information according to the embodiment.

DESCRIPTION OF EMBODIMENTS

Embodiment of disclosed communication control apparatus, communication control system, communication control method, and communication control program disclosed will be described below in detail based on the drawings. Note that the present invention is not limited by the embodiment. The embodiments can be combined with each other as appropriate.

Overview of NFV Architecture

Figure 11:
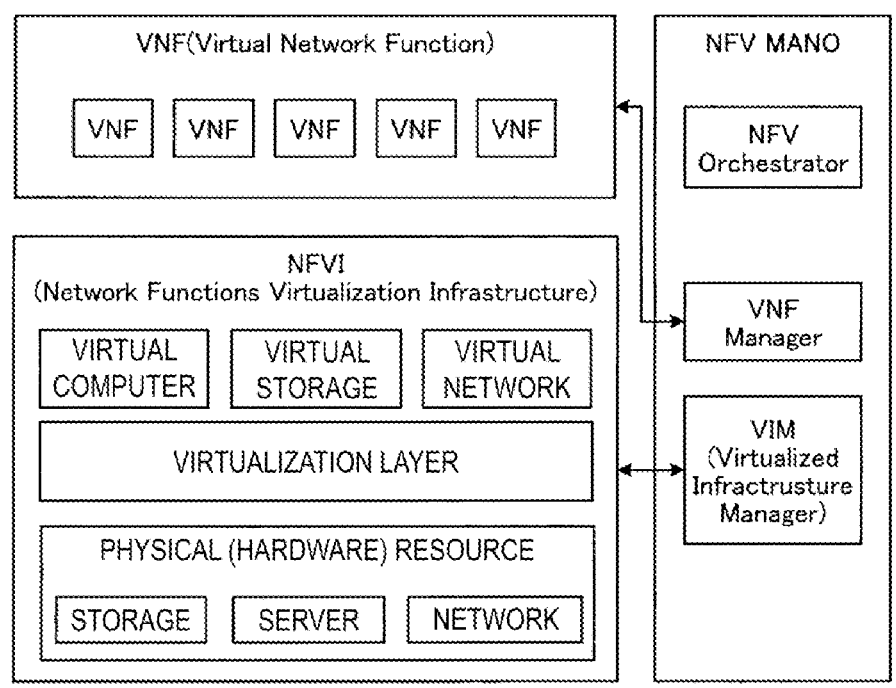
FIG. 11 is a diagram illustrating an example of the NFV architecture.

FIG. 11 is a diagram illustrating an example of an NFV architecture. Prior to describing the embodiment, an example of the NFV architecture is described as the premise of the present embodiment.

The Network Functions Virtualization (NFV) is a technology to implement a network function by a virtualization. The NFV implements the network function by virtually operating the network equipment by software. The network function implemented by the NFV is referred to as a Virtual Network Function (VNF).

To implement the NFV, first, an infrastructure referred to as a Network Functions Virtualization Infrastructure (NFVI) is constructed on the cloud. The NFVI includes a physical resource (hardware resource) and a virtualization layer, and a Virtual Network Function (VNF) that implements each function of the NFV on the NFVI. The NFVI includes, for example, physical resources such as a server, a storage, a network, and the like, and a hypervisor that realizes virtualization, and the like.

Further, NFV MANO is constructed as software that controls and manages the NFVI. The NFV MANO stands for Network Functions Virtualization Management and Network Orchestration. The NFV MANO performs functions such as activation and setting of the NFVI, and registration of users of other network services. The NFV MANO includes an NFV Orchestrator (NFVO), a VNF Manager (VNFM), and a Virtualized Infrastructure Manager (VIM).

The NFVO spans a plurality of VIMs and integrally manages the virtual resources on the NFVI across a plurality of VIMs. For example, when receiving a request to generate a new VNF from the VNFM, the NFVO selects the VIM that meets the request and makes a response. The NFVO also has a function of configuring a network service and controlling a life cycle.

The VNFM manages the VNF. For example, the VNFM performs activation, stoppage, scaling, etc. of the VNF.

The VIM manages resources for the physical computer, the physical storage, and the physical network. The VIM also generates the virtual resources in response to requests from the upper VNFM and the NFVO.

In case of providing network slices on the NFV architecture, the configuration including three layers may be conceived: a service operator, a slice provider, and an infrastructure operator. The service operator is an operator that offers a service to the end user. The slice provider is an operator that, in response to a request of the service operator, constructs a necessary slice from the virtual resources of the infrastructure operator and provides the constructed slice to the service operator. The infrastructure operator is an operator that virtualizes the physical infrastructure and provides the virtual resources required for the slice provider.

Slice Gateway (SLG)

The SLG is a gateway virtually constructed on the NFVI. For example, the SLG is disposed at an edge portion of the slice constructed on the physical resources of each infrastructure operator, and is connected to an SLG constructed on the physical resources of the other infrastructure operator.

Figure 12:
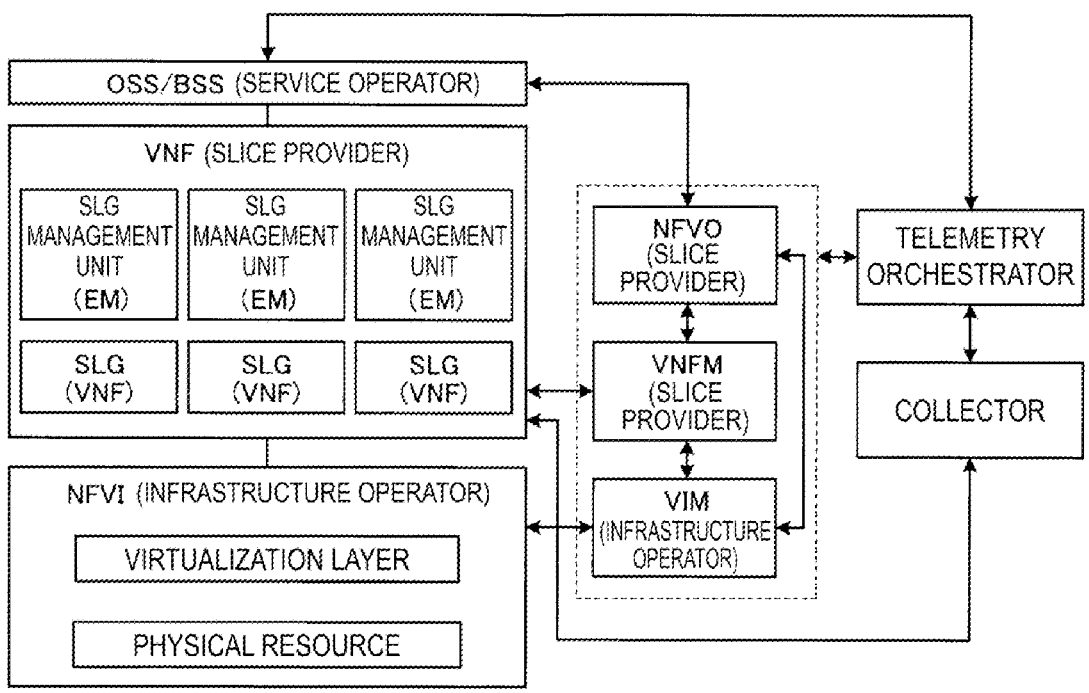
FIG. 12 is a diagram illustrating an example of the configuration in which slice gateways are constructed on the NFV architecture.

FIG. 12 is a diagram illustrating an example of the configuration in which SLGs are constructed on the NFV architecture. As illustrated in FIG. 12, the SLG is constructed as the VNF. Then, a SLG management unit that manages the respective SLG is constructed as an Element Manager (EM). Note that the EM is a function block that manages a network device. Note that an Operations Support System (OSS) illustrated in FIG. 12 is, for example, a system that finds and addresses failures and congestions occurring in a mobile communication network. Moreover, a Business Support System (BSS) is, for example, a business support system used for customer management and order management of the communication operator. In the example in FIG. 12, the OSS/BSS is assumed to be managed by the service operator. The OSS/BSS is, for example, an operation management system for the service operator. It is also assumed that the VNF, the NFVO and the VNFM are managed by the slice provider. It is also assumed that the NFVI and the VIM are managed by the infrastructure operator.

In addition, the architecture illustrated in FIG. 12 includes a telemetry orchestrator and a collector. The telemetry orchestrator and the collector enable the acquisition and utilization of telemetry information for each slice. The collector collects and analyzes the telemetry information of the slice detected at each SLG. The telemetry orchestrator collects the telemetry information from the collector and cooperates with the OSS/BSS and the NFVO to manage slices. It is assumed that the telemetry orchestrator and collector are also managed by the slice provider.

Figure 1:
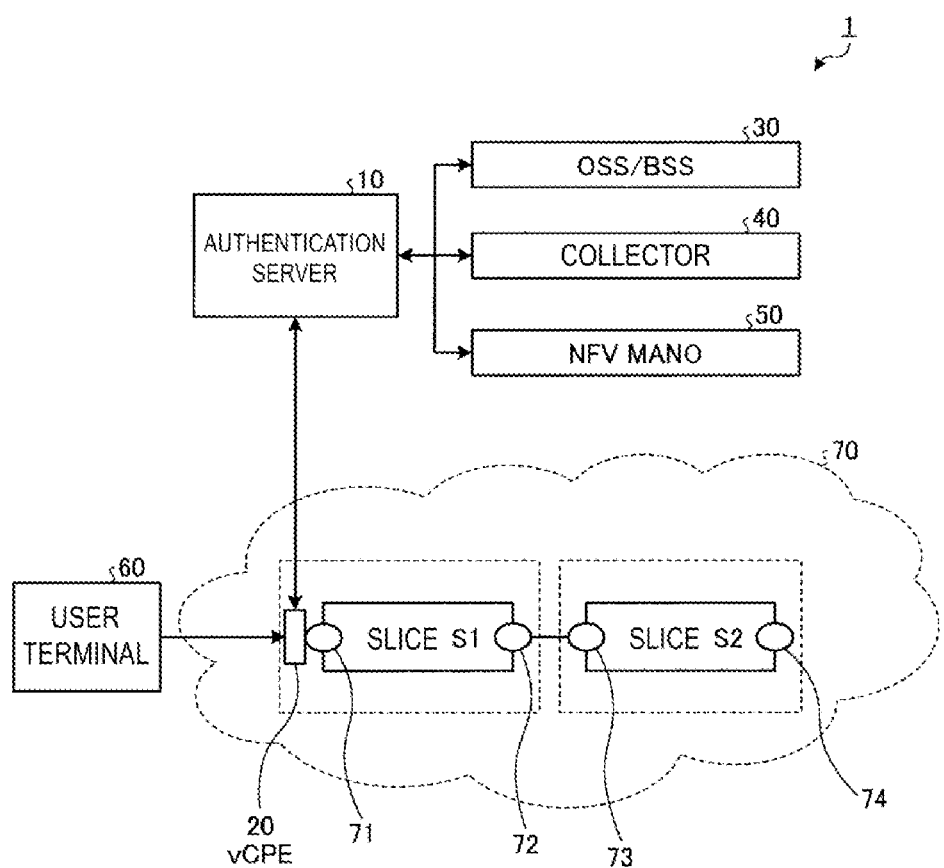
FIG. 1 is a diagram illustrating an example of the general configuration of a communication control system according to an embodiment.

Example of Configuration of Communication Control System 1 According to Embodiment FIG. 1 is a diagram illustrating an example of the general configuration of a communication control system 1 according to an embodiment. The communication control system 1 according to the embodiment uses the same function unit to implement authentication processing of the user of the virtual network and selection processing of the network slice assigned to the user, using the NFV architecture as a base.

In the example in FIG. 1, the communication control system 1 according to the embodiment includes an authentication server 10, virtual Customer Premise Equipment (vCPE) 20, an OSS/BSS 30, a collector 40, NFV MANO 50, a user terminal 60, and a virtual network 70.

The authentication server 10 is an example of a communication control apparatus. The authentication server 10 authenticates the user of the virtual network 70 constructed based on the NFV architecture. The authentication server 10 also selects a slice through which the user's data flow passes when the user attempts to access the virtual network 70. The authentication server 10 notifies the vCPE 20 of the selected slice. The configuration and function of the authentication server 10 will be described later.

The vCPE 20 is a virtually constructed CPE. The vCPE 20 receives a request of the user attempting to access the virtual network 70 from the user terminal 60. In response to the received request, the vCPE 20 transmits an authentication request to the authentication server 10. Note that the authentication request includes information for uniquely identifying the user. For example, the authentication request includes information for uniquely identifying the user based on information stored in the authentication server 10, such as a user ID (Identifier).

The vCPE 20 also receives a notification of the authentication result from the authentication server 10. For example, the vCPE 20 receives a notification that the authentication has failed. In this case, the vCPE 20 returns a notification that the communication is not permitted to the user terminal 60 that has transmitted the request. Note that when the authentication is successful, the vCPE 20 starts communication without providing any notification to the user terminal 60.

The vCPE 20 also receives, from the authentication server 10, information identifying the virtual network through which data flow corresponding to the request passes. The information identifying the virtual network is, for example, information that identifies one or more slices included in the virtual network. The information identifying the slices is, for example, a slice ID, which is an identifier that uniquely identifies each slice. The information identifying the virtual network is, for example, information that identifies the SLG disposed in the one or more slices. The information identifying the SLG is, for example, an SLG ID that is an identifier that uniquely identifies each SLG.

Note that the vCPE 20 may receive, as information identifying the virtual network, a stack in which the slice IDs or the SLG IDs of the plurality of slices are arranged in the order of passage of the data flow. The vCPE 20 may also create a stack of slice IDs or SLG IDs based on information received from the authentication server 10.

The vCPE 20 transmits the stack that identifies the virtual network through which the data flow passes to an adjacent SLG, e.g. SLG 71. Here, the "adjacent" SLG refers to an SLG constructed on the same physical resource as the vCPE 20 or an SLG that is physically close to the vCPE in the virtual network through which the data flow passes.

The SLG 71 is a slice gateway disposed at the edge portion of a slice S1. The SLG 71 collects telemetry information of the slice S1. The SLG 71 collects telemetry information such as traffic and delay of the slice S1. The SLG 71 stores the collected telemetry information in a predetermined storage unit (not illustrated). The SLG 71 also transmits the collected telemetry information to the collector 40. The transmission mode of the telemetry information is not particularly limited. For example, the SLG 71 may periodically transmit the telemetry information to the collector 40 or may transmit the telemetry information in response to a request of the collector 40.

The SLG 71 also causes the data flow transmitted from the user to pass through the slice S1 based on the stack received from the vCPE 20. When transmitting the data flow, the SLG 71 transmits the stack received from the vCPE 20 together with the data flow. The transmitted data flow and SLG ID stack are received at an SLG 72 disposed at the other edge portion of the slice S1 in which the SLG 71 is disposed.

The SLG 72 transmits the received data flow and stack to the next SLG identified by the stack, such as an SLG 73. In this manner, in response to the request transmitted from the user terminal 60, the data flow is transmitted through the path selected by the authentication server 10. Note that the SLGs 71 to 74 each have similar configuration and function.

The OSS/BSS 30 is an operation management system, for example, a server operated by the service operator in the NFV architecture described above (see FIG. 12). The OSS/BSS 30 stores information about the user to which the service operator offers the service. The OSS/BSS 30 stores service quality guaranteed for each user and service contents offered to the user. The service quality is, for example, Service Level Agreement (SLA). The service contents are the type of the VNF offered to the user, and the like. The OSS/BSS 30 stores the service contents and the service quality that are offered to the user identified by the user ID, for example, in association with the user ID.

The OSS/BSS 30 is communicatively connected to the authentication server 10 and the NFV MANO 50. In response to a request from the authentication server 10, the OSS/BSS 30 associates the information identifying the user, for example, the user ID, with the service quality guaranteed for the user and the service contents, and transmits them to the authentication server 10. Note that the OSS/BSS 30 may be configured to transmit information in response to a request from the authentication server 10, or may be configured to periodically transmit information.

The OSS/BSS 30 also transmits a request to create a predetermined virtual network (slice) based on a contract with the user to the NFV MANO. The request may specify a slice from a predetermined catalog or may request the creation of a new slice.

The collector 40 collects and analyzes telemetry information collected at a plurality of SLGs disposed in the virtual network 70 (see FIG. 12). In the example illustrated in FIG. 1, the collector 40 is illustrated as a separate function unit, but the configuration and arrangement of the collector 40 are not particularly limited.

The NFV MANO 50 manages and centrally controls the NFV architecture that constructs the virtual network 70 (see FIGS. 11 and 12). The NFV MANO 50 manages and consolidates the NFVI and the VNF that implement the virtual network 70. The NFV MANO 50 is communicatively connected to the authentication server 10 and the OSS/BSS 30. The NFV MANO 50 also manages and consolidates the configuration, function, change, and the like of the virtual network 70.

The user terminal 60 is an information processing apparatus used by a user using the virtual network 70. The type of the user terminal 60 is not particularly limited. The user terminal 60 may be, for example, a personal computer (PC), a home gateway (HGW), and any information processing apparatus that uses the virtual network 70. Note that while one user terminal 60 is illustrated in FIG. 1, the number of user terminals connected to the virtual network 70 is not particularly limited.

The virtual network 70 is a virtually constructed communication network implemented in the communication control system 1. The virtual network 70 may be constructed on physical resources offered by a plurality of infrastructure operators. The virtual network 70 includes one or more slices. The configuration of the slice constructed in the virtual network 70 is controlled by the NFV MANO 50.

Example of Configuration of Authentication Server 10

Figure 2:
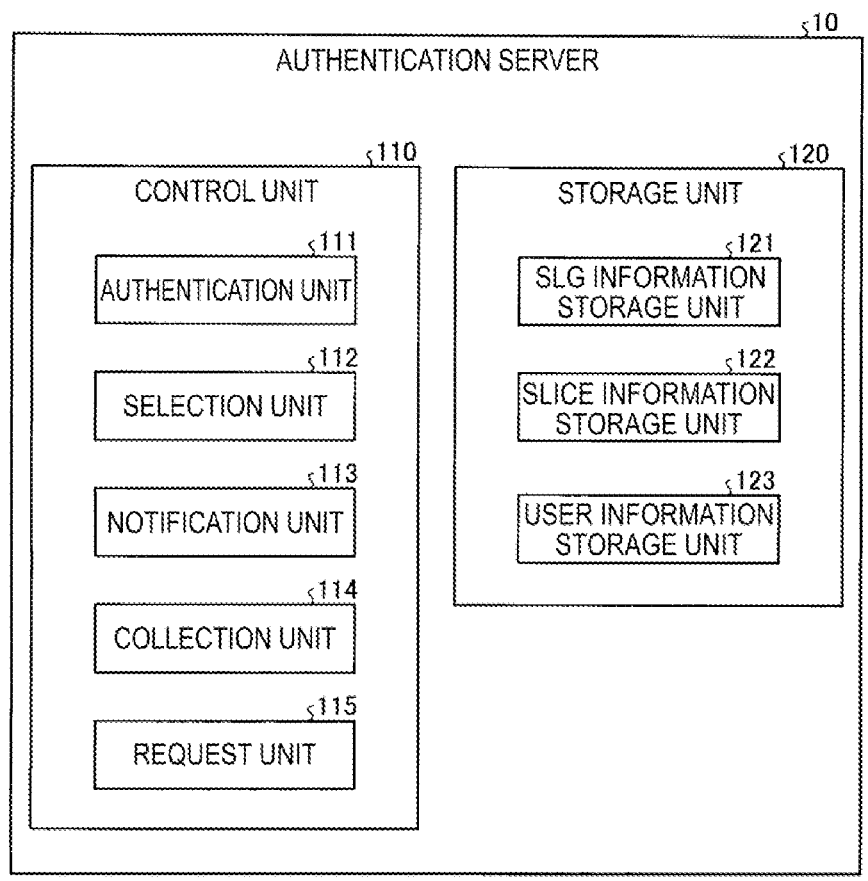
FIG. 2 is a diagram illustrating an example of the configuration of an authentication server (communication control apparatus) according to the embodiment.

FIG. 2 is a diagram illustrating an example of the configuration of the authentication server (communication control apparatus) according to the embodiment. Note that, as described below, the authentication server 10 may be virtually constructed on the NFVI.

The authentication server 10 includes a control unit 110 and a storage unit 120.

The control unit 110 controls communication control processing of the authentication server 10. An electronic circuit such as a Central Processing Unit (CPU) or a Micro Processing Unit (MPU) or an integrated circuit such as an Application Specific Integrated Circuit (ASIC) or a Field Programmable Gate Array (FPGA) may be used as the control unit 110. The control unit 110 includes a storage unit configured to store programs and control data that define processing procedures and the like in the authentication server 10. Further, the control unit 110 functions as various processing units by operating various programs.

The storage unit 120 is a storage device that stores various kinds of information. Note that the storage unit 120 may be a semiconductor memory capable of rewriting data such as a Random Access Memory (RAM), a flash memory, or the like. The device used as the storage unit 120 is not particularly limited.

The storage unit 120 includes a slice gateway information storage unit 121, a slice information storage unit 122, and a user information storage unit 123. The slice gateway information storage unit 121 stores slice gateway information. The slice information storage unit 122 stores slice information. The user information storage unit 123 stores user information of the virtual network 70. The information stored in each of the storage units will be described below.

Example of Configuration of Slice Gateway Information

FIG. 3A is a diagram illustrating an example of the configuration of the slice gateway information corresponding to one SLG according to the embodiment. FIG. 3B is a diagram illustrating an example of the configuration of the slice gateway information stored in the slice gateway storage unit 121 according to the embodiment.

The slice gateway information is information about the SLG constructed as the VNF in the communication control system 1. In the example in FIG. 3A, the slice gateway information includes, for example, "SLG ID", "entire holding band", "remaining band", "memory", "CPU", and "NFV". The "SLG ID" is an identifier that uniquely identifies each slice. The "entire holding band" is the entire holding band of the physical resources under the SLG. The "remaining band" is an unused band of the physical resources under the SLG. That is, the remaining band is a band that is not assigned to the user of the virtual network in the physical resources under the SLG. The "memory" is the memory capacity of the physical resources under the SLG. The "CPU" is the performance of a Central Processing Unit (CPU) of the physical resources under the SLG. The "NFV" is a virtual network function implemented by the SLG.

For example, in the example in FIG. 3A, "entire holding band, 100 G", "remaining band, 30 G", "memory, 2000 TB", and "CPU, A scalable processor" are stored in association with "SLG ID, SLG001". This indicates that the entire holding band of the physical resources under the SLG identified by the SLG ID "SLG001" is 100 G. This also indicates that the unused band in the band of physical resources under the SLG identified by the SLG ID "SLG001" is 30 G. This also indicates that the memory under the SLG identified by the SLG ID "SLG001" has a capacity of 2000 TB, and A scalable processor is used as the CPU. Additionally, in the example in FIG. 3A, "DPI, AI, optimize, and transcoding" are stored as "NFV" of the SLG identified by the SLG ID "SLG001". This also indicates that the SLG has the functions of Deep Packet Inspection (DPI), Artificial Intelligence (AI), optimize, and transcoding, as virtual network functions. Note that the slice gateway information may include, in addition to the information illustrated in FIG. 3A, information identifying the location of the SLG, and the NFVI for which the SLG is to be constructed, etc.

The slice gateway information is held in each SLG. Also, the slice gateway information of all SLGs included in the virtual network 70 is held in the collector 40. The slice gateway information collected in the collector 40 is transmitted to the authentication server 10 and stored in the slice gateway information storage unit 121. The slice gateway information stored in the slice gateway information storage unit 121 is associated with each SLG ID and stored, as illustrated in FIG. 3B.

Example of Configuration of Slice Information

FIG. 4 is a diagram illustrating an example of the configuration of slice information according to the embodiment. The slice information is information about each slice constructed in the virtual network 70. For example, in the example in FIG. 4, the "SLG", "holding band", "remaining band", "delay", "NFV", and "user ID" are stored in association with the slice ID. The "SLG" is information identifying the SLG disposed at the edge portion of the slice. For example, the SLG ID is stored as "SLG". The "holding band" is the holding band of the physical resources assigned to the slice. The "remaining band" is the remaining band of the physical resources assigned to the slice. The "delay" is a communication delay between the SLGs disposed at the edge portions of the slice. The "NFV" is a virtual network function implemented in the slice. The "holding band", "remaining band", and "NFV" are information summarizing the slice gateway information of the SLG disposed at the edge portion of the slice. The "User ID" is the user ID of the user to which the slice is assigned.

The slice information may also be stored in association with a service ID of the service to which the slice is assigned. The authentication server 10 appropriately acquires user information from the OSS/BSS 30 and stores the information in the storage unit 120. When a new slice is created, the NFV MANO 50 transmits slice information about the slice to the authentication server 10. The authentication server 10 appropriately stores slice information about the new slice in the storage unit 120.

Example of Configuration of User Information

FIG. 5 is a diagram illustrating an example of the configuration of the user information according to the embodiment. The user information is user information of the virtual network 70. The authentication server 10 acquires the user information from the OSS/BSS 30 and stores the user information in the user information storage unit 123. In the example in FIG. 5, the user information includes "user ID", "service contents", and "service quality". The "user ID" is information that uniquely identifies the user of the virtual network 70. The "service contents" are service contents offered to the user. The "service quality" is service quality guaranteed for the user. The service quality is, for example, SLA. The service quality and the service contents are one example of quality information. The user information may also include information for user authentication.

Configuration and Function of Control Unit 110

Returning to FIG. 2, the configuration and function of the control unit 110 of the authentication server 10 will be described.

The control unit 110 includes an authentication unit 111, a selection unit 112, a notification unit 113, a collection unit 114, and a request unit 115.

The authentication unit 111 receives an authentication request transmitted from the vCPE 20. The authentication unit 111 authenticates the user based on the authentication request. Note that the specific flow and technique of the authentication processing are not particularly limited. The authentication server 10 may acquire the user information for the authentication processing from the OSS/BSS 30 and store the information in the storage unit 120 in advance, or may acquire the information for authentication from the OSS/BSS 30 in response to the receipt of the authentication request.

When the user authentication succeeds, the authentication unit 111 notifies the selection unit 112 of this success. In addition, the authentication unit 111 controls the vCPE 20 that has transmitted the authentication request according to the authentication. Alternatively, when the user authentication fails, the authentication unit 111 notifies vCPE 20 of the failure.

When receiving the notification of the success of authentication from the authentication unit 111, the selection unit 112 determines the presence/absence of a slice assigned to the user based on the user ID or the like included in the authentication request. When the slice assigned to the user is previously registered with the storage unit 120 or the like, the selection unit 112 selects the slice to be assigned to the user. Alternatively, when the slice assigned to the user is not registered, the selection unit 112 acquires quality information corresponding to the user from the storage unit 120 or the OSS/BSS 30. The selection unit 112 extracts and selects a slice that satisfies the quality identified based on the acquired quality information from the slice information storage unit 122. Alternatively, when the slice that satisfies the quality is not stored in the slice information storage unit 122, the selection unit 112 notifies the request unit 115 of the fact. When a new slice has been created as a result of the processing of the request unit 115, the selection unit 112 selects the new slice. When the new slice has been created, the communication control system 1 may be configured such that the slice information is transmitted from the NFV MANO 50 to the authentication server 10 and stored in the storage unit 120.

The notification unit 113 notifies the vCPE 20 of the slice selected by the selection unit 112. The notification unit 113 notifies the vCPE 20 of the slice ID of the slice selected by the selection unit 112, for example. For example, the notification unit 113 notifies the vCPE 20 of the slice IDs of the plurality of slices selected by the selection unit 112. The notification unit 113 may transmit the stack of slice IDs arranged in the order of passage of the user's data flow to the vCPE 20. The notification unit 113 may also transmit the stack of SLG IDs identifying the SLGs disposed in the slice selected by the selection unit 112, which are arranged in the order of passage of the user's data flow to the vCPE 20.

The collection unit 114 collects information from the OSS/BSS 30, the collector 40, and the NFV MANO 50 and transmits the information to each of the function units. The collection unit 114 stores the collected information in the storage unit 120. The information collected by the collection unit 114 is, for example, information about the user of the virtual network 70, the service quality, information about the service contents, information about the slice assigned to the user, and the like, which are held in the OSS/BSS 30. Also, the information collected by the collection unit 114 is telemetry information of each slice collected by the collector 40. Also, the information collected by the collection unit 114 is slice gateway information of each SLG. Also, the information collected by the collection unit 114 is information about a new slice newly created in the NFV MANO 50. The information collected by the collection unit 114 is stored in the storage unit 120 as appropriate.

When the selection unit 112 cannot select a slice, the request unit 115 receives a notification of the fact. When the request unit 115 receives the notification, the request unit 115 transmits a request to the OSS/BSS 30 to newly create a slice that satisfies quality information corresponding to the user. When the OSS/BSS 30 receives the request, the OSS/BSS 30 requests the NFV MANO 50 to create a new slice. The NFV MANO 50 creates the new slice and transmits the notification that the new slice has been created and information about the slice to the OSS/BSS 30. The authentication server 10 collects the information about the new slice from the OSS/BSS 30 and stores the information in the storage unit 120.

Figure 6:
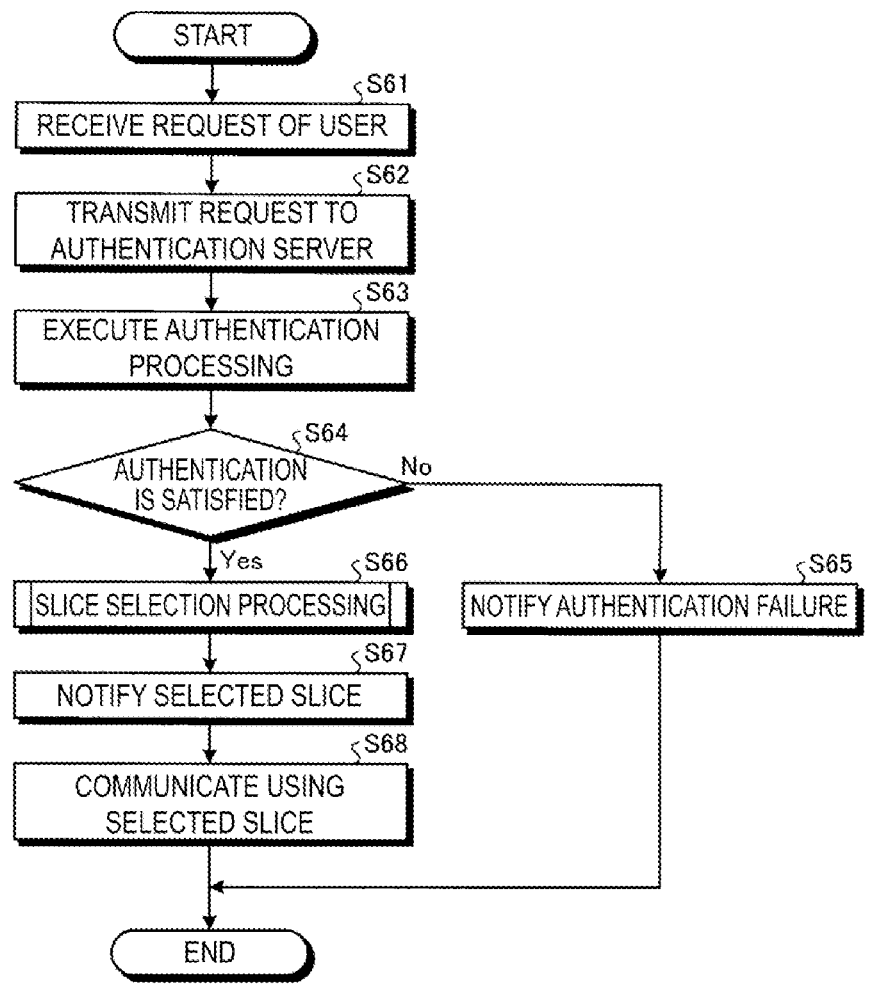
FIG. 6 is a flowchart illustrating an example of processing flow in a communication control system according to the embodiment.

Example of Flow of Communication Control Processing FIG. 6 is a flowchart illustrating an example of processing flow in a communication control system 1 according to the embodiment. First, in the communication control system 1, the vCPE 20 receives a request of the user who accesses the virtual network 70 (step S61). The vCPE 20 that has received the request transmits an authentication request to the authentication server 10 (step S62). The authentication server 10 executes the authentication processing in response to the authentication request (step S63). When authentication fails (No in step S64), the authentication server 10 notifies the vCPE 20 of the failure (step S65). On the contrary, when the authentication succeeds (Yes in step S64), the authentication server 10 then executes the slice selection processing (step S66). The authentication server 10 notifies the vCPE 20 of the slice selected as a result of the slice selection processing (step S67). The vCPE 20 transmits information about the selected slice to the SLG for the communication using the notified slice (step S68). Then, the user's data flow is transmitted via the selected slice. This terminates the processing.

Figure 7:
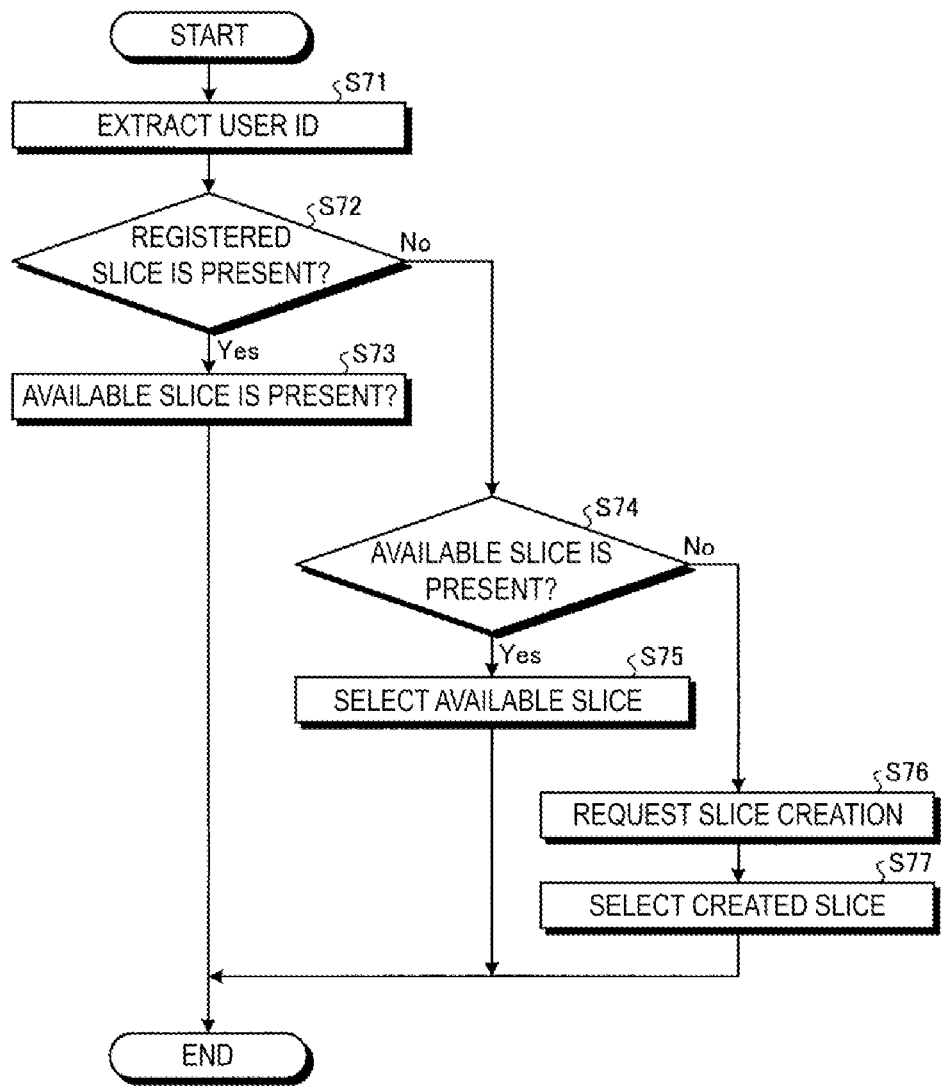
FIG. 7 is a flowchart illustrating an example of slice selection processing flow in the communication control system according to the embodiment.

Example of Flow of Slice Selection Processing FIG. 7 is a flowchart illustrating an example of slice selection processing flow (step S66 in FIG. 6) in the communication control system 1 according to the embodiment. The slice selection processing is executed by the authentication server 10. First, the selection unit 112 of the authentication server 10 extracts the user ID from the authentication request (step S71). The selection unit 112 refers to the slice information stored in the storage unit 120 to determine whether or not a slice registered in association with the user ID is present (step S72). When it is determined that the registered slice is present (Yes in step S72), the selection unit 112 selects the registered slice (step S73). Alternatively, when it is determined that the registered slice is not present (No in step S72), the selection unit 112 determines whether or not an available slice is present (step S74). For example, the selection unit 112 refers to service quality information acquired from the slice information storage unit 122 and the OSS/BSS 30 to determine whether or not a slice that satisfies service quality information is present. Then, the selection unit 112 determines that an available slice is present when the slice that satisfies the service quality information is present (Yes in step S74), and selects the slice as the available slice (step S75). On the contrary, the selection unit 112 determines that the available slice is not present when the slice that satisfies the service quality information is present (No in step S74), and notifies the request unit 115 of the fact. The request unit 115 requests the OSS/BSS 30 to create a new slice (step S76). Once the new slice is created, the selection unit 112 selects the created new slice (step S77). This terminates the slice selection processing.

Figure 8:
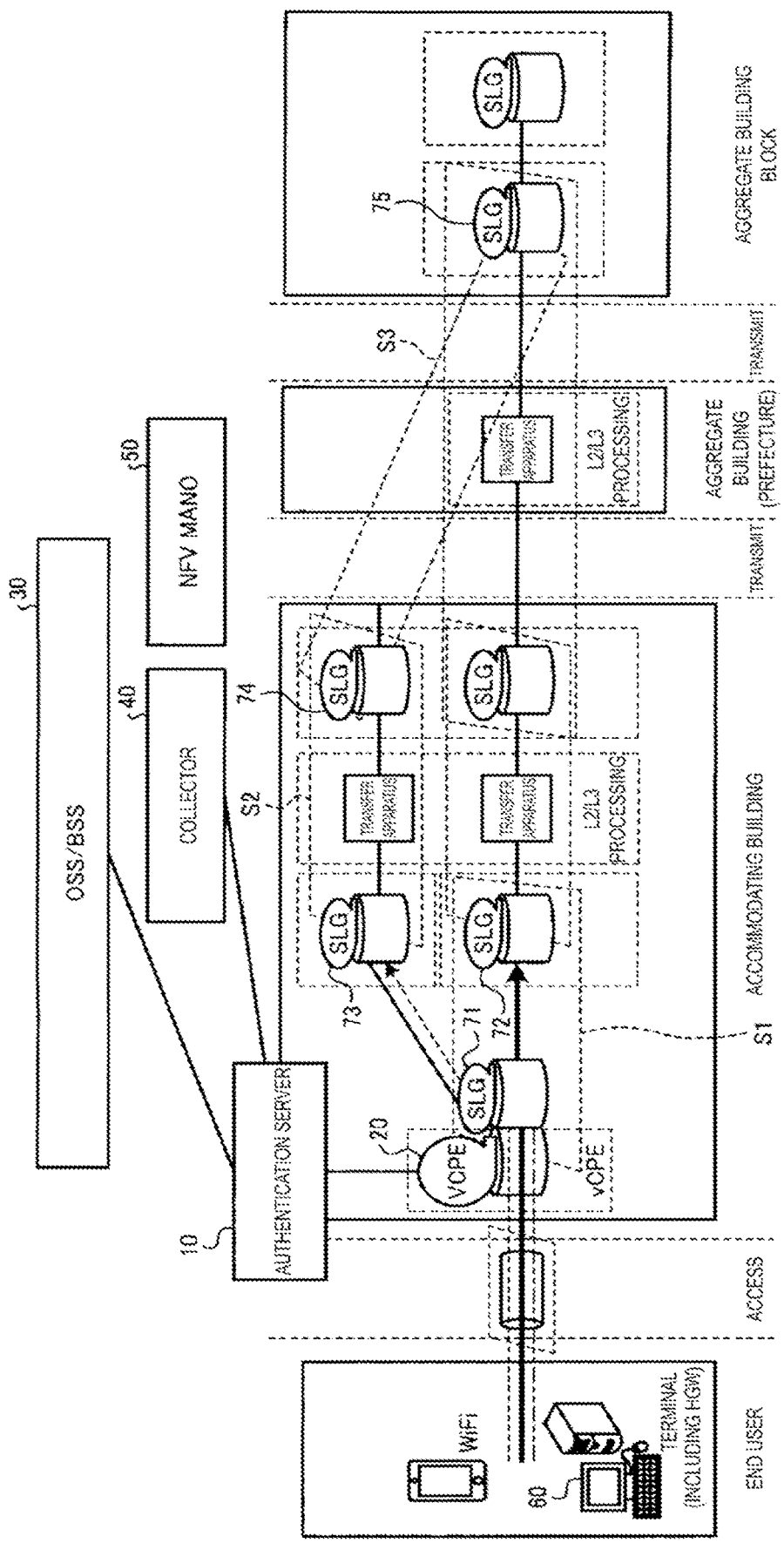
FIG. 8 is a flowchart illustrating processing flow in the communication control system according to the embodiment.

FIG. 8 is a flowchart illustrating processing flow in the communication control system according to the embodiment. FIG. 8 illustrates the state where a plurality of slices are connected via the SLG. In the example illustrated in FIG. 8, the terminal (user terminal 60) located on the left end performs communication via the virtual network 70. The communication is executed via a plurality of slices selected by the authentication server 10. First, the user terminal 60 accesses the vCPE 20 disposed at the edge portion of the virtual network 70. The vCPE 20 transmits an authentication request to the authentication server 20 in response to a request transmitted from the user terminal 60. The authentication server 10 authenticates the user (user terminal 60) in response to the authentication request. Then, the authentication server 10 selects (a plurality of) slices through which user's communication passes according to the destination of the data flow. The authentication server 10 transmits information about the selected slices to the vCPE 20. The vCPE 20 transmits the received slice information as a stack to an adjacent SLG.

In the example of FIG. 8, the information about the selected slice is transmitted from an SLG 71 disposed on the vCPE 20 side of a left slice S1 to an SLG 73 disposed at the edge portion of a slice S2. The SLG 73 refers to the slice information to identify a slice S3 selected next, and transmits the data flow and the slice information to an SLG 74. The SLG 74 refers to the slice information, identifies a next destination for the data flow, and transmits the data flow and the slice information to an SLG 75. In this manner, the user's data flow is transmitted from the user terminal 60 to the SLG 75 in an aggregate building that is a destination.

Example of Case of Realizing Authentication Server 10 as VNF

Figure 9:
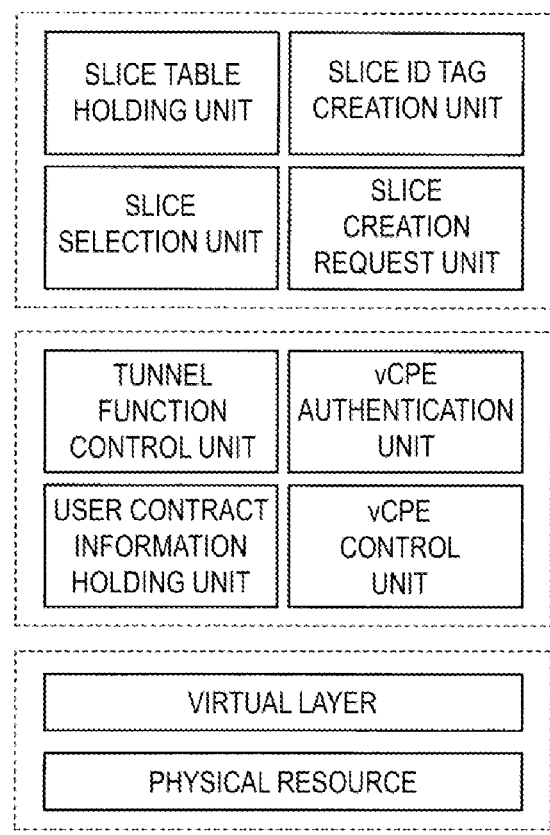
FIG. 9 is a diagram illustrating an example of functional blocks for implementing an authentication server according to the embodiment on an NFV architecture.

FIG. 9 is a diagram illustrating an example of functional blocks for implementing an authentication server 10 according to the embodiment on an NFV architecture. In the example illustrated in FIG. 9, each of the function units is implemented as a VNF on a virtualization layer constructed based on physical resources. The function units (VNF) illustrated in FIG. 9 include, for example, a slice table holding unit, a slice ID tag creation unit, a slice selection unit, and a slice creation request unit. The function units (VNF) illustrated in FIG. 9 further include, for example, a tunnel function control unit, a user contract information holding unit, a vCPE authentication unit, and a vCPE control unit.

The slice table holding unit is a function unit that collects and holds information about each slice from the SLG, the OSS/BSS 30, the collector 40, and so on. The slice table holding unit corresponds to the collection unit 114 and the storage unit 120 in FIG. 2.

The slice ID tag creation unit is a function unit that creates and assigns a tag that uniquely identifies information about each slice based on the information collected by the slice table holding unit. The slice ID tag creation unit creates and assigns the slice ID (FIG. 4), for example.

The slice selection unit is a function unit that dispatches the slice to the user in response to an authentication request. The slice selection unit corresponds to the selection unit 112 (FIG. 2).

The slice creation request unit is a function unit that requests a new slice in the absence of a registered slice. The slice creation request unit corresponds to the request unit 115 (FIG. 2).

The tunnel function control unit is a function unit that controls the tunnel function in the virtual network 70. For example, the tunnel function control unit controls the function of a tunnel when communication is performed using the tunnel in the virtual network.

The user contract information holding unit is a function unit that collects and holds contract information of the user of the virtual network 70. The user contract information holding unit corresponds to the collection unit 114 and the storage unit 120 in FIG. 2. The contract information is, for example, service contents and service quality (SLA).

The vCPE authentication unit is a function unit that executes authentication processing of the vCPE 20. The vCPE authentication unit corresponds to the authentication unit 111 in FIG. 2.

The vCPE control unit is a function unit that controls the operation and function of the vCPE 20.

Note that the distribution of the functions illustrated in FIG. 9 is an example. The pattern of the distribution and integration of the function units in the case where the function of the authentication server 10 are realized as the VNFs is not particularly limited. Each of the function units illustrated in FIG. 9 may be divided and integrated as appropriate.

In the above embodiment, the slice selection processing is executed after the authentication processing, but the authentication processing and the slice selection processing may be executed in parallel. Further, the acquisition timing and the acquisition method of each information stored in the storage unit 120 are not particularly limited.

Effects of Embodiment

As described above, the communication control apparatus according to the embodiment thus includes the authentication unit, the selection unit, and the notification unit. The authentication unit authenticates the user based on the authentication request transmitted from the virtual Customer Premise Equipment (CPE) in response to the request of the user who accesses the virtual network. The selection unit refers to information about the user of the virtual network and information about the network slice constructed in the virtual network to select the network slice through which the user's data flow passes. The user information of the virtual network is held by the operation management system of the service operator. The network slice information is collected by the collector. The notification unit notifies the virtual CPE of the network slice selected by the selection unit. Thus, it is not necessary for the SLG to select a slice through which the user's data flow passes, reducing the processing loads on the SLG. Thus, it is possible to prevent the SLG from becoming a bottleneck of mass data flow. Thus, the communication control apparatus according to the embodiment may achieve large-capacity network slices.

The communication control system according to the embodiment further includes the operation management system, the collector, the virtual CPE, and the communication control apparatus. The operation management system holds the user information of the virtual network. The collector collects the information about the network slice constructed in the virtual network. The virtual CPE receives the request of the user who accesses the virtual network. The communication control apparatus includes the authentication unit, the selection unit, and the notification unit. The authentication unit authenticates the user based on the authentication request transmitted from the virtual CPE in response to the user's request. The selection unit refers to information about the user of the virtual network and information about the network slice constructed in the virtual network to select the network slice through which the user's data flow passes. The notification unit notifies the virtual CPE of the network slice selected by the selection unit. As described above, the communication control system according to the embodiment can distribute loads for realization of the virtual network to realize the large-capacity network slice.

In the communication control system according to the embodiment, the communication control apparatus further includes the collection unit and the storage unit. The collection unit collects, from the collector, information about delay, band, Network Function Virtualization (NFV), location, transcoding of the network slice constructed in the virtual network. The storage units stores the information collected by the collection unit in association with each of the network slices. Then, the selection unit selects the network slice through which the user's data flow passes based on the information stored in the storage unit. Thus, the communication control apparatus may recognize the telemetry of the slice and assign the user's data flow to the slice having proper quality. In this manner, the communication control system according to the embodiment may provide a high-quality virtual network (slice) to the user.

Further, in the communication control system according to the embodiment, the collection unit further collects quality information guaranteed for the user of the virtual network from the operation management system, and stores the quality information in the storage unit. Then, the selection unit selects a network slice through which the user's data flow passes based on the quality information stored in the storage unit. Thus, the communication control system according to the embodiment may provide the virtual network (slice) that meets the user's request.

Also, in the communication control system according to the embodiment, the selection unit selects a plurality of network slices. Then, the virtual CPE stacks identification information identifying each of the network slices selected by the selection unit, and transmits the stacked identification information to the SLG adjacent to the virtual CPE among the SLG included in the slices identified by the identification information. Thus, the SLG does not need to determine the destination of the data flow in the own apparatus, and can dispatch the data flow based on the received stack. Thus, the communication control system according to the embodiment can reduce the processing loads on the SLG.

In the communication control system according to the embodiment, when no network slice to be selected is present, the selection unit transmits a network slice creation request to the operation management system. Thus, the communication control system according to the embodiment may create a new slice to quickly meet the user's request, even when the slice that meets the user's request is not registered.

The communication control method according to the embodiment is executed by the communication control apparatus (authentication server). The communication control method according to the embodiment includes an authentication step, a selection step, and a notification step. In the authentication step, the communication control apparatus authenticates the user based on the authentication request transmitted from the virtual CPE in response to the request of the user who accesses the virtual network. In the selection step, the communication control apparatus refers to information, held by the service operator's operation management system, about the user of the virtual network, and information, collected by the collector, about the network slice constructed in the virtual network, and selects the network slice through which the user's data flow passes. In the notification step, the communication control apparatus notifies the virtual CPE of the network slice selected in the selection step. Thus, the communication control method according to the embodiment may implement a large-capacity network slice.

The communication control program according to the embodiment includes an authentication step, a selection step, and a notification step. In the authentication step, the computer authenticates the user based on the authentication request transmitted from the virtual CPE in response to a request of the user who accesses the virtual network. In the selection step, the computer refers to information about the user of the virtual network and information about the network slice constructed in the virtual network, and selects the network slice through which the user's data flow passes. The information about the user is held by a service operator's operation management system. The network slice information is collected by the collector. In the notification step, the computer notifies virtual CPE of the network slice selected in the selection step. Thus, the communication control program according to the embodiment may implement a large-capacity network slice.

System Configuration and the like Each element of each apparatus illustrated is a functional concept and does not necessarily need to be physically configured as illustrated. That is, the specific form of distribution and integration of each apparatus is not limited to the illustrated form, and the entirety or a portion of the form can be configured by being functionally or physically distributed and integrated in any unit, depending on various loads, usage conditions, and the like. Further, all or some of processing functions performed by each apparatus may be realized by a Central Processing Unit (CPU) and a program analyzed and executed by the CPU, or may be realized as hardware by wired logic.

Further, all or some of the processing described as being automatically performed, among the processing described in the present embodiment, can also be manually performed, or all or some of the processing described as being manually performed can also be automatically performed by a known method. In addition, information including the processing procedures, the control procedures, the specific names, and various data and parameters described in the above-described document and drawings can be changed as appropriate except for the case of special description.

Program

As one embodiment, the authentication server 10 can be implemented by installing a communication control program for executing the processing described above in a desired computer as packaged software or on-line software. For example, an information processing apparatus can function as the authentication server 10 by causing the information processing apparatus to execute the above-described communication control program. The information processing apparatus described here includes a desktop or notebook personal computer as its processing capability and storage capacity satisfy requirements. In addition, a mobile communication terminal such as a smart phone, a mobile phone, or a Personal Handyphone System (PHS) and a slate terminal such as a Personal Digital Assistant (PDA) are included in the category of the information processing apparatus.

Figure 10:
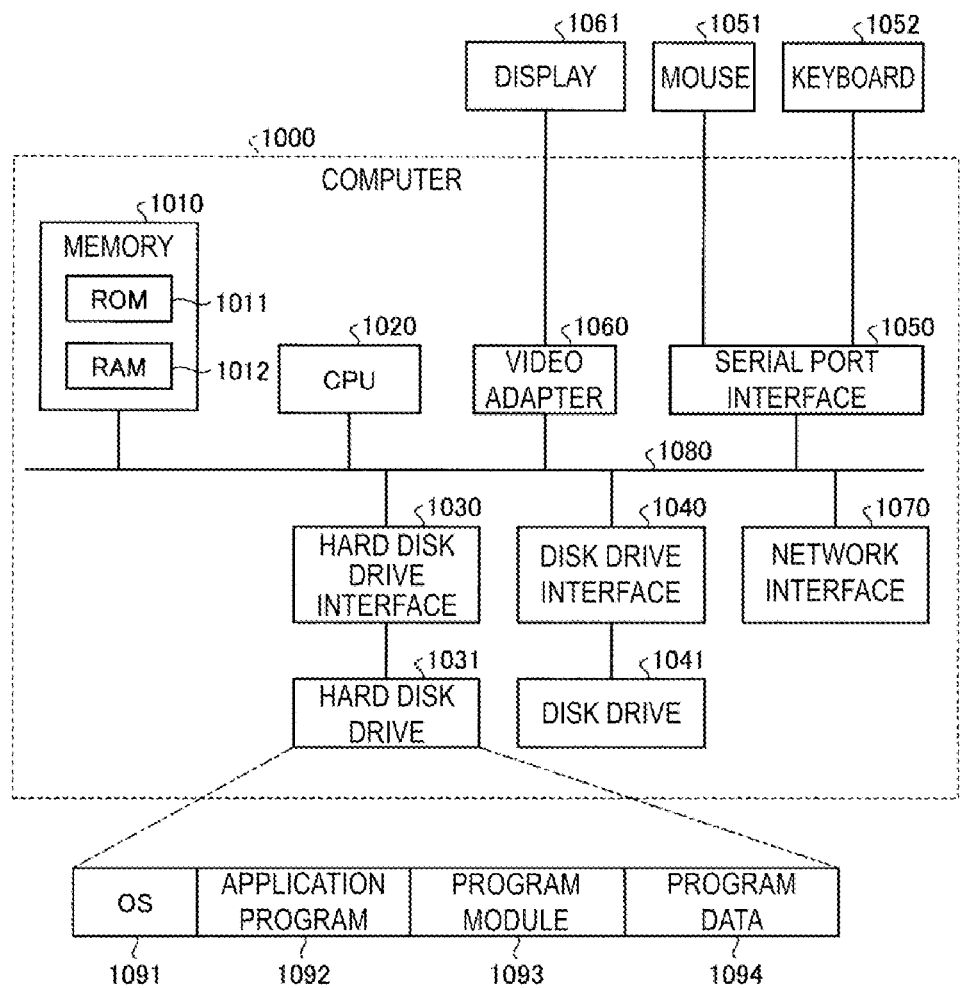
FIG. 10 is a diagram illustrating an example of a computer that implements a communication control apparatus according to the embodiment by executing a program.

FIG. 10 is a diagram illustrating an example of a computer for realizing the communication control apparatus in the embodiment (the authentication server 10) by executing a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a Random Access Memory (RAM) 1012. The ROM 1011 stores a boot program, such as Basic Input Output System (BIOS), for example. The hard disk drive interface 1030 is connected to the hard disk drive 1031. The disk drive interface 1040 is connected to a disk drive 1041. A removable storage medium such as a magnetic disk or an optical disc is inserted into the disk drive 1041. The serial port interface 1050 is connected to, for example, a mouse 1051 and a keyboard 1052. The video adapter 1060 is connected to, for example, a display 1061.

Here, the hard disk drive 1031 stores, for example, an OS 1091, an application program 1092, a program module 1093, and program data 1094. That is, the program defining each processing of the IoT GW 10 is implemented as the program module 1093 in which codes executable by the computer 1000 are described. The program module 1093 is stored in, for example, the hard disk drive 1031. For example, the program module 1093 for executing processing similar to the functional configuration in the IoT GW 10 is stored in hard disk drive 1031. Note that the hard disk drive 1031 may be replaced with a Solid State Drive (SSD).

In addition, data used in the processing of the above-described embodiment is stored in, for example, the memory 1010 or the hard disk drive 1031, as the program data 1094. The CPU 1020 reads the program module 1093 and the program data 1094 that are stored in the memory 1010 and the hard disk drive 1031 to the RAM 1012 and executes them as necessary.

Note that the program module 1093 and the program data 1094 are not limited to being stored in the hard disk drive 1031, and may be stored, for example, in a removable storage medium, and read by the CPU 1020 via the disk drive 1041 or the like. Alternatively, the program module 1093 and the program data 1094 may be stored in other computers connected via a network (a Local Area Network (LAN), a Wide Area Network (WAN), or the like). In addition, the program module 1093 and the program data 1094 may be read by the CPU 1020 from another computer through the network interface 1070.

The above-described embodiment, and variations thereof, are within the scope of the invention and equivalents thereof set forth in the claims, as included in the technology disclosed herein.

REFERENCE SIGNS LIST

1 Communication control system
10 Authentication server
110 Control unit
111 Authentication unit
112 Selection unit
113 Notification unit
114 Collection unit
115 Request unit
120 Storage unit
121 Slice gateway information storage unit
122 Slice information storage unit
20 vCPE (virtual Customer Premise Equipment)
30 OSS/BSS
40 Collector and analysis unit
50 NFV MANO
60 User terminal
70 Virtual network
71, 72, 73, 74, 75 Slice gateway

The invention claimed is:

1. A communication control apparatus comprising a processor configured to execute an operation comprising:
   authenticating a user based on an authentication request transmitted from virtual Customer Premise Equipment (CPE) in response to a request of the user who accesses a virtual network;
   referring to first information associated with the user of the virtual network, the information being held by an operation management system, and second information associated with a network slice in the virtual network;
   selecting, based on the first and second information, the network slice through which data flow of the user passes; and
   notifying the virtual CPE of the selected network slice.

2. The communication control apparatus according to claim 1, the processor further configured to execute an operation comprising:
   collecting the second information including delay, band, Network Function Virtualization (NFV), location, and transcoding of the network slice constructed in the virtual network;
   associating the second information with the network slice; and
   storing the collected second information, wherein selecting the network slice through which data flow of the user passes based on the stored information.

3. The communication control apparatus according to claim 1, the processor further configured to execute an operation comprising:
   collecting quality information associated with the user of the virtual network;
   storing the quality information; and
   selecting the network slice through which data flow of the user passes based on the stored quality information.

4. The communication control apparatus according to claim 1, the processor further configured to execute an operation comprising:
   selecting a plurality of the network slices;
   stacking, by the virtual CPE, identification information, wherein the identification information identifies each of the selected plurality of the network slices; and
   transmitting the stacked identification information to a slice gateway adjacent to the virtual CPE among slice gateways included in the selected plurality of the network slices identified based on the identification information.

5. The communication control apparatus according to claim 1, the processor further configured to execute an operation comprising:
   transmitting, based on the first and second information, a network slice creation request without selecting the network slice.

6. A communication control system comprising a processor configured to execute an operation comprising:
   storing first information about a user of a virtual network;
   collecting second information about a network slice constructed in the virtual network;
   receiving a request of a user who accesses the virtual network;
   authenticating the user based on an authentication request transmitted from virtual Customer Premise Equipment (CPE) in response to the user request;
   referring to the first information about the user of the virtual network and the second information about the network slice constructed in the virtual network;

selecting, based on the first and second information, the network slice through which data flow of the user passes; and
notifying the virtual CPE of the selected network slice.

7. The communication control system according to claim 6, the processor further configured to execute an operation comprising:
collecting, second information including delay, band, Network Function Virtualization (NFV), location, and transcoding of the network slice constructed in the virtual network;
associating the second information with the network slice; and
storing the second information, wherein
selecting the network slice through which data flow of the user passes is based on the stored second information.

8. The communication control system according to claim 7, the processor further configured to execute an operation comprising:
collecting, quality information guaranteed for the user of the virtual network;
storing the quality information; and
selecting the network slice through which data flow of the user passes based on the stored quality information.

9. The communication control system according to claim 8, the processor further configured to execute an operation comprising:
selecting a plurality of the network slice;
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

10. The communication control system according to claim 7, the processor further configured to execute an operation comprising:
selecting a plurality of the network slice;
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

11. The communication control system according to claim 6, the processor further configured to execute an operation comprising:
selecting a plurality of the network slices; and
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

12. The communication control system according to claim 6, the processor further configured to execute an operation comprising:
transmitting, based on the firs and second information, a network slice creation request without selecting the network slice.

13. A communication control method comprising:
authenticating a user based on an authentication request transmitted from virtual Customer Premise Equipment (CPE) in response to a request of the user who accesses a virtual network;
referring to first information, held by an operation management system, associated with the user of the virtual network, and second information associated with a network slice in the virtual network;
selecting, based on the first and second information, the network slice through which data flow of the user passes; and
notifying the virtual CPE of the network slice selected by the performing of selection.

14. The communication control method according to claim 13, the method further comprising:
collecting the second information including delay, band, Network Function Virtualization (NFV), location, and transcoding of the network slice constructed in the virtual network;
associating the second information unit with the network slice; and
storing the collected second information, wherein selecting the network slice through which data flow of the user passes is based on the stored second information.

15. The communication control method according to claim 14, further comprising:
selecting a plurality of the network slices;
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

16. The communication control method according to claim 13, the method further comprising:
collecting quality information associated with the user of the virtual network;
storing the quality information;
selecting the network slice through which data flow of the user passes based on the stored quality information.

17. The communication control method according to claim 16, further comprising:
selecting a plurality of the network slices;
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

18. The communication control method according to claim 17, further comprising:
transmitting a network slice creation request when no network slice to be selected is present.

19. The communication control method according to claim 13, further comprising:
selecting a plurality of the network slices; and
stacking, by the virtual CPE, identification information, wherein the identification information identifies each of the selected plurality of the network slices; and
transmitting the stacked identification information to a slice gateway adjacent to the virtual CPE among slice gateways included in the selected plurality of the network slices identified based on the identification information.

20. The communication control method according to claim 13, further comprising:

transmitting, based on the first and second information, a network slice creation request without selecting the network slice.

* * * * *